United States Patent
Ma et al.

(10) Patent No.: US 8,666,428 B2
(45) Date of Patent: Mar. 4, 2014

(54) METHOD TO SUPPORT USER LOCATION IN IN-STRUCTURE COVERAGE SYSTEMS

(75) Inventors: Zhengxiang Ma, Summit, NJ (US); Theodore Sizer, II, Little Silver, NJ (US)

(73) Assignee: Alcatel Lucent, Paris (FR)

( * ) Notice: Subject to any disclaimer, the term of this patent is extended or adjusted under 35 U.S.C. 154(b) by 1468 days.

(21) Appl. No.: 12/010,668

(22) Filed: Jan. 29, 2008

(65) Prior Publication Data

US 2009/0191891 A1    Jul. 30, 2009

(51) Int. Cl.
*H04W 24/00* (2009.01)

(52) U.S. Cl.
USPC .................. 455/456.1; 455/456.2; 455/456.5

(58) Field of Classification Search
USPC ................................ 455/456.1, 456.2, 456.5
See application file for complete search history.

(56) References Cited

U.S. PATENT DOCUMENTS

| | | | |
|---|---|---|---|
| 6,507,741 B1 * | 1/2003 | Bassirat ........................ | 455/440 |
| 2004/0166879 A1 * | 8/2004 | Meadows et al. .......... | 455/456.1 |
| 2004/0219930 A1 * | 11/2004 | Lin .............................. | 455/456.1 |
| 2005/0143091 A1 | 6/2005 | Shapira et al. | |
| 2005/0157675 A1 | 7/2005 | Feder et al. | |
| 2005/0281363 A1 * | 12/2005 | Qi et al. ........................ | 375/349 |
| 2006/0025158 A1 | 2/2006 | Leblanc et al. | |
| 2006/0209752 A1 | 9/2006 | Wijngaarden et al. | |
| 2007/0268853 A1 | 11/2007 | Ma et al. | |

FOREIGN PATENT DOCUMENTS

| | | |
|---|---|---|
| CN | 1778135 | 5/2006 |
| EP | 1 448 008 | 8/2004 |
| JP | 2005-017069 | 1/2005 |
| WO | WO 02/087275 | 10/2002 |
| WO | WO 2004/054290 | 6/2004 |
| WO | 2005/032202 | 4/2005 |
| WO | WO 2006/076600 | 7/2006 |

OTHER PUBLICATIONS

International Search Report and Written Opinion dated Apr. 27, 2009.
Office Action for corresponding Chinese patent application No. 200980103118.4 dated May 18, 2012 with English translation.
Japanese Office Action for Appln. No. 2010-545069, dated Jun. 11, 2012, and English translation thereof.
Second Chinese Office Action for Appln. No. 200980103118.4, dated Nov. 15, 2012, and English translation thereof.
Notification of the Third Office Action and Text for Chinese Appln. No. 200980103118.4, dated May 16, 2013, and English translation thereof.
Notification of Reasons for Refusal for Japanese Appln. No. 2010-545069, dated Jul. 2, 2013, and English translation thereof.
Korean Office Action dated Nov. 11, 2011, issued in KR Application No. 10-2010-7019137 and English translation thereof.

* cited by examiner

*Primary Examiner* — Justin Lee
(74) *Attorney, Agent, or Firm* — Harness, Dickey & Pierce (57) ABSTRACT

In an example embodiment of the present invention, the method includes creating a plurality of data packets. Each data packet in the plurality of data packets includes a plurality of coded cellular signals. The plurality of data packets are sent over a data network associated with at least one sector served by a plurality of transceivers, and at least one of the plurality of transceivers broadcasts the data packets. A location of a mobile station is determined based on received multi-paths associated with response from the mobile station to broadcast of at least one of the plurality of data packets.

9 Claims, 7 Drawing Sheets

METHOD TO SUPPORT USER LOCATION IN IN-STRUCTURE COVERAGE SYSTEMS

BACKGROUND OF THE INVENTION

Currently, there are several methods and devices that provide tracking of mobile devices. The tracking may provide real-time positioning of a device in an outside environment. For example, the device and its user may be located by using a device that has an assisted global positioning system (AGPS) or a device that uses a tri-angulation/tri-lateration method. The device may be a standalone GPS system, or a tracking system may be integrated in a mobile station, personal digital assistant (PDA), portable computer, etc. For discussion purposes and throughout the specification, it is assumed that the "device" is a mobile station, but is not limited thereto.

In an indoor environment, such as a large office building, locating a mobile station is more difficult, because location signals, e.g., GPS signals, may not be received by a mobile station. Further, if cellular coverage inside the building is provided by outdoor base stations, the complex propagation environment of the building reduces the accuracy of the tri-angulation or tri-lateration method. In addition, if the cellular coverage inside the building is provided by a distributed antenna system (DAS), the delay in the DAS system may distort the results of the triangulation or tri-lateration method, causing significant inaccuracy.

SUMMARY OF THE INVENTION

The present invention relates to a method of locating a mobile station.

In an example embodiment of the present invention, the method includes creating a plurality of data packets. Each data packet in the plurality of data packets includes a plurality of coded cellular signals. The plurality of data packets are sent over a data network associated with at least one sector served by a plurality of transceivers, and at least one of the plurality of transceivers broadcasts the data packets. A location of a mobile station is determined based on received multi-paths associated with response from the mobile station to broadcast of at least one of the plurality of data packets.

In an example embodiment of the present invention, the method includes creating a plurality of data packets. Each data packet in the plurality of data packets includes a plurality of coded cellular signals. The plurality of data packets are sent over a data network associated with at least one sector served by a plurality of transceivers, and at least one of the plurality of transceivers broadcasts the data packets. Each of the plurality of transceivers also broadcasts a pilot beacon signal such that at least two of the plurality of transceivers broadcast different pilot beacons signals. A location of a mobile station is determined based on the pilot beacon signals that the mobile station reports receiving.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

DETAILED DESCRIPTION OF THE EXAMPLE EMBODIMENTS

Terminologies used herein are for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-section illustrations that may be schematic illustrations of idealized embodiments (and intermediate structures). Thus, the example embodiments should not be construed as limited to the particular location and arrangements illustrated herein but are to include deviations thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "mobile" may be considered synonymous to, and may hereafter be occasionally referred to, as a mobile unit, mobile station, mobile user, access terminal (AT), user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station, NodeB, etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

Distributed Antenna System

In-building wireless coverage may be provided by a dedicated base transceiver station (BTS), also known as a base station sector, through a distributed antenna system (DAS). The BTS may be located within the building, or the BTS may be located external to the building. Accordingly, if a mobile station is located inside a building, and the mobile station does not receive adequate GPS signals or related signal reception, the only location information available is a sector ID of the BTS. If the BTS covers the entire building, then the location of the mobile station is limited to the building.

Figure 1:
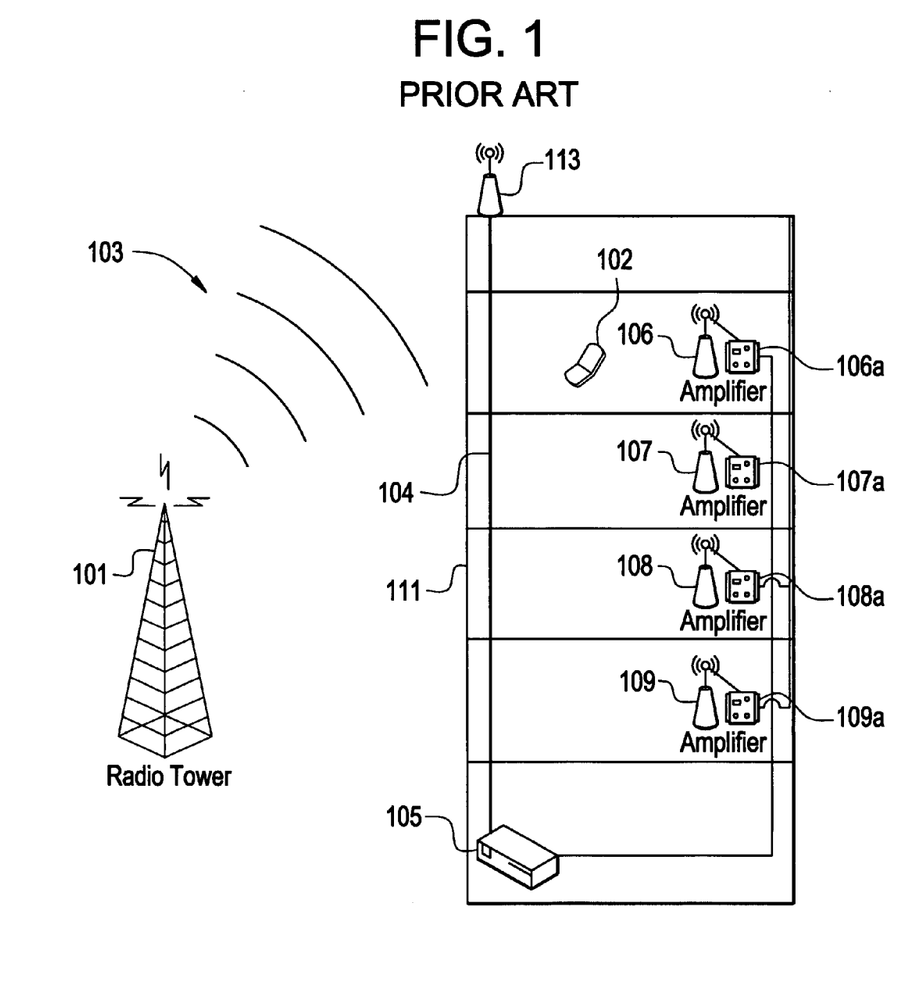
FIG. 1 illustrates a distributed antenna system (DAS) of the prior art.

A prior art distributed antenna system (DAS) is illustrated in FIG. 1. A DAS uses a base station and a repeater or power amplifier that is typically located within a building to retransmit, within (throughout) the building, a signal received from an external base station.

Referring to the conventional DAS illustrated in FIG. 1, when a signal 103 is transmitted from an antenna 101 in a communication network, the signal 103 is received by an external building antenna 113. The signal 103 is then passed along a connection 104, which may be a coaxial cable, to a component 105, which may be a radio repeater. The repeater 105 forwards the signal 103 to amplifiers 106a, 107a, 108a and 109a. These amplifiers 106a, 107a, 108a and 109a amplify the signal 103, which is then respectively transmitted over in-building antennas 106, 107, 108 and 109. Accordingly, a mobile station 102 receives the signal 103 transmitted from the antenna 113 via the antenna 106. The signal 103 will have been passed along the wired connection 104 to the repeater 105 and rebroadcast over the antennas 106-109.

Figure 2:
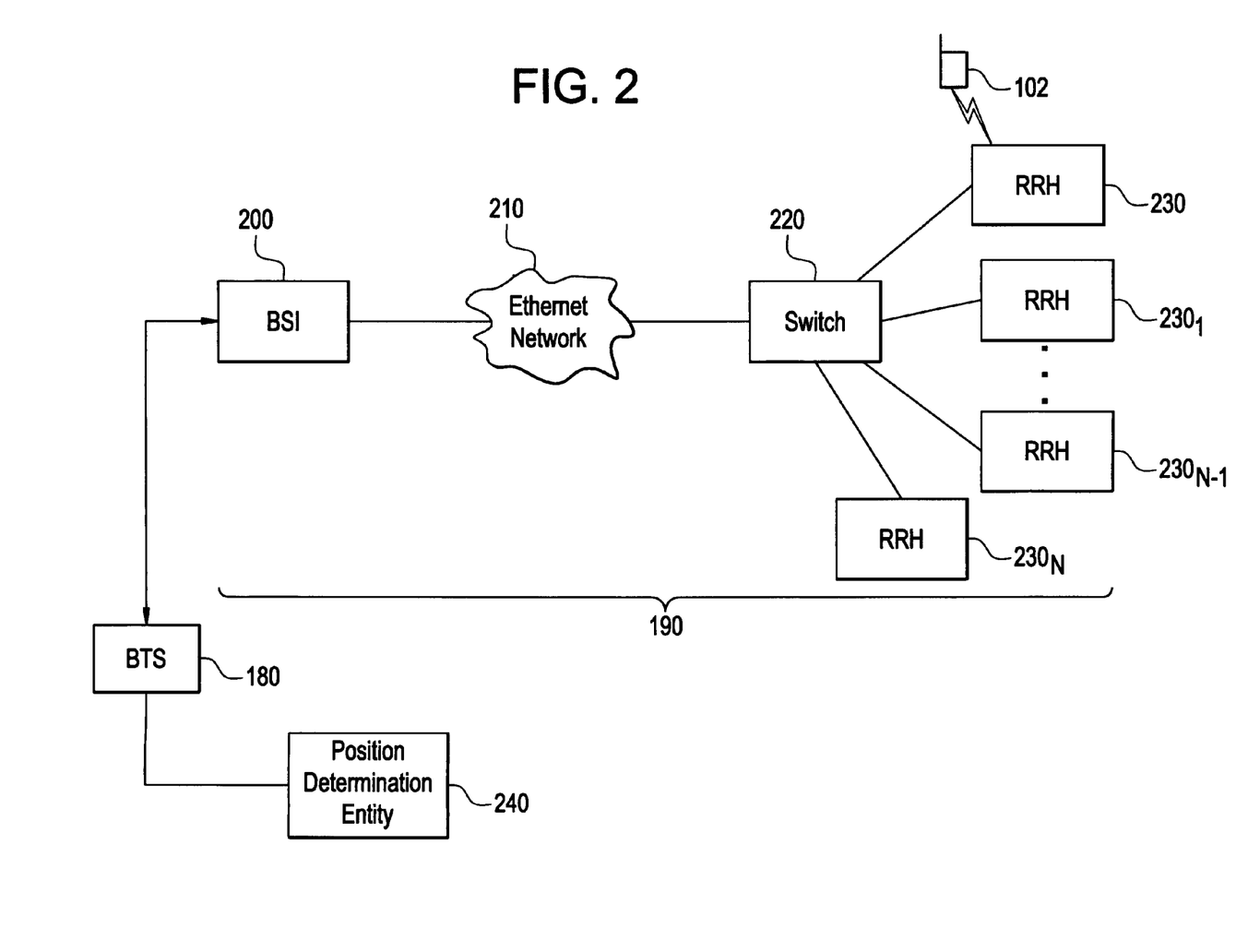
FIG. 2 illustrates a portion of a wireless communication system according to an embodiment of the present invention.

FIG. 2 illustrates a portion of a wireless communication system according to an embodiment of the present invention. This embodiment includes another embodiment of a distributed antenna system (DAS). As shown, the DAS 190 includes a base station interface (BSI) 200. The BSI 200 may replace radio frequency (RF) generating equipment in a base transceiver station (BTS), such as that used in a cellular communications network (e.g., a CDMA network), or the BSI 200 may be external to the BTS 180 as shown in FIG. 2. For downlink signals, when the BSI 200 receives coded baseband signals from a processor, such as a CDMA Modem Unit (CMU) in the BTS 180, the BSI 200 buffers the baseband signals and periodically creates data packets, each containing a plurality of coded baseband signals. The BSI 200 then forwards the data packets over a high-speed data network 210, such as a gigabit Ethernet network (GEN), to one or more switches 220, for example, a gigabit switch. The switches 220 may be considered part of the GEN. These switches 220 duplicate and route the data packets to one or more specific ports corresponding to a cellular sector which in turn corresponds to one or more radio transceivers, known as remote radio heads (RRHs) $230\text{-}230_n$. A mobile station 102 receives signals transmitted by one of the RRHs $230\text{-}230_n$ on the downlink. Typically, a RRH has a coverage radius of about 30-40 meters.

For uplink signals, for example, a RRH 230 receives uplink signals from the mobile station 102. The RRH 230 converts the signals to a digital format, generates packets of coded signals, and forwards them to the switch 220. The switch 220 sends the data packets through the network 210 to the BSI 200. The data packets are further sent to the BTS 180 for transmission through a traditional wireless network to an intended recipient. As will be described in greater detail below, the BTS 180 sends reports on the received signals to a position determining entity 240, which determines the position of a mobile station 102 according to one or more embodiments of the present invention as described in detail below.

Wireless coverage in a building may be provided by the RRHs $230\text{-}230_n$ located throughout the building. The RRHs $230\text{-}230_n$ are synchronized to the BSI 200 to ensure accurate frequency and timing of the RF signal over the air. The RRHs $230\text{-}230_n$ may also be powered by an Ethernet cable, e.g., a power-over-Ethernet (POE) cable, eliminating the need for an AC drop and significantly reducing the installation cost.

The signal of a single BTS 180 may be simulcast by the RRHs $230\text{-}230_n$. Since it is more economical to support fewer cellular carriers per RRH, when the capacity needs increase beyond that of a single BTS, the RRHs may be grouped into multiple groups, each supporting a sector. Here, "sector" may mean the entire building, several floors of the building, a single floor of a building, or a specific location within a floor. For example, a high rise office building may be divided into two or more sectors, and each sector includes a group of RRHs to cover a specific area of the building. In FIG. 2, RRHs $230_n$ and $230_{n-1}$ may be in a group as sector 1, and RRHs 230 and $230_1$ may be in a group as sector 2. Sector 1 may cover floors 1-5, and sector 2 may cover floors 6-10.

Initially, the general location of a mobile station 102 may be identified by the BTS sector ID. However, the BTS sector ID cannot locate the mobile station 102 at a specific floor or a precise location within a building.

An example embodiment of the present invention will now be described with reference to FIGS. 2-4. In a DAS, an RRH includes a jitter buffer. The jitter buffer temporally stores arriving packets in order to minimize delay variations. The readout from the jitter buffer is controlled to precisely determine the delay for the downlink signal. The uplink data packaging process is linked to a play out of the downlink data and re-uses a time stamp of the downlink packets. In an uplink packet transport, the packet streams from the RRHs of the same BTS sector are combined together to form a single packet stream. The combination involves a weighted sum of the data samples in the packet streams. In the combination process, packets from the RRHs with the same time stamp are combined together. This ensures that the uplink signals from the RRHs experience exactly the same transportation delay through the combination process, even though the combination may happen in multiple stages and each individual packet stream may go though different numbers of stages of combination.

A unique round trip delay, i.e., an artificial delay time for a signal from a RRH to reach a mobile station and back, may be assigned to each of the RRHs by controlling the readout from the jitter buffer, which affects the downlink delay, or by controlling the uplink data packaging process, which affects the uplink delay, or a combination of both. For certain air-interfaces such as CDMA/UMTS, it may be desirable to keep the downlink delay the same for all RRHs so that the orthogonality of the downlink signals received at mobile stations is preserved, even if the downlink signals received come from multiple RRHs.

Conventionally RRHs sends a frame, for example, every 10 milliseconds (msec) to a mobile station in the uplink. The mobile station also responds to the downlink frame every 10 msec. If each of the RRHs has adds a unique delay to the cellular signal, the BTS 180 will receive multi-paths associated with different RRHs from the mobile station 102.

The BTS 180 reports this unique delay signature or profile to a position determining entity 240. Based on the unique delay signature or profile, the position determining entity 240 determines to which of the RRHs the mobile station 102 is closest. In particular, once a unique delay is associated with a specific RRH, the mobile station 102 may be determined to be within a coverage footprint of a particular RRH associated with the delay of the dominant multi-path. Because the location of the RRHs are known, this determination substantially locates the mobile station 102.

Figure 3:
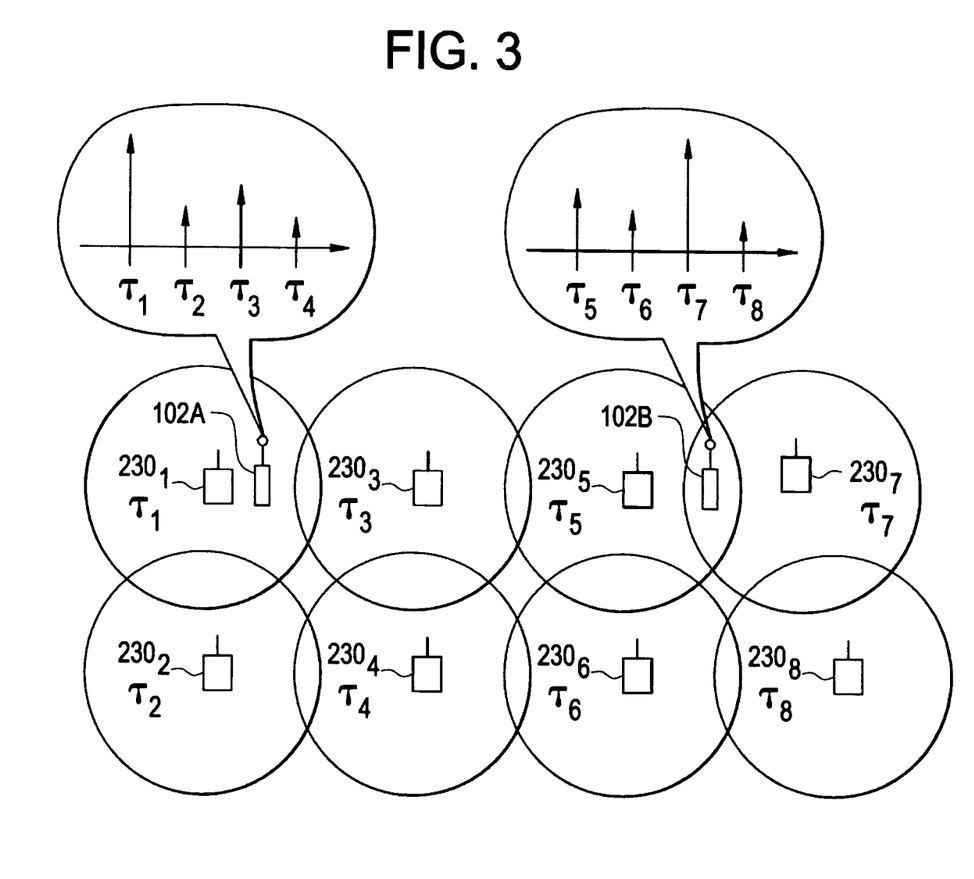
FIG. 3 illustrates uplink multi-paths profiles according to an example embodiment of the present invention.

As shown in FIG. 3, depending on the location of a mobile station 102A or 102B, a profile of the uplink multipaths for the respective mobile stations 102A and 102B received by the BTS 180 from the RRHs $230_1\text{-}230_8$ is different.

FIG. 3 shows eight (8) RRHs $230_1$-$230_8$. Each of the eight (8) RRHs $230_1$-$230_8$ may form individual sectors, the eight (8) RRHs $230_1$-$230_8$ may collectively form a single sector, or the eight (8) RRHs $230_1$-$230_8$ may form between 1 to 8 sectors. Each of the RRHs $230_1$-$230_8$ may be assigned a unique delay $\tau_1$-$\tau_8$, respectively.

The delays $\tau_1$-$\tau_8$ shown in FIG. 3 are largely artificial delays created using one or more of the mechanisms described above. The actual propagation delays from the mobile station 102A, 102B to one of the RRHs $230_1$-$230_8$ may be substantially smaller due to the short range of the RRHs $230_1$-$230_8$. The delay of a dominate path may be used to identify the RRH that is providing the dominant coverage for the mobile station 102A, 102B, and hence used to determine the mobile station's location. The value of the differences in the delay between the RRHs $230_1$-$230_8$ may be determined by a capability of the air interface standard in resolving multi-path delay and the mobile station's timing accuracy. For example, in the CDMA system, the BTS 180 has the capability to resolve multi-paths that are 1 chip, or 0.8 μs, apart from each other. As can be seen from FIG. 3, mobile station 102A has a dominant (e.g., highest power) path associated with delay $\tau_1$, accordingly, the BTS 180 will report the dominate path $\tau_1$ to the position determining entity 240. Alternatively, the BTS 180 may report the received power at each delay $\tau_1$-$\tau_8$ and the position determining entity 240 determines which delay has the dominate received power. In either case, the positioning determining entity 240 maintain information on which RRH is associated with which delay, and determines the mobile 102A or 102B as being positioned closest to the RRH associated with the dominant multi-path.

If the entire multi-path profile at the BTS 180 is available and reported to the position determining entity 240, the location of the mobile station 102A, 102B determined by the position determining entity 240 may be further refined. If the time resolution of the multi-path profile is sufficient to give information on the propagation delays of the uplink signal to the different RRHs, then the position determining entity 240 may further use tri-lateration to determine the mobile station's location with greater accuracy.

Figure 4:
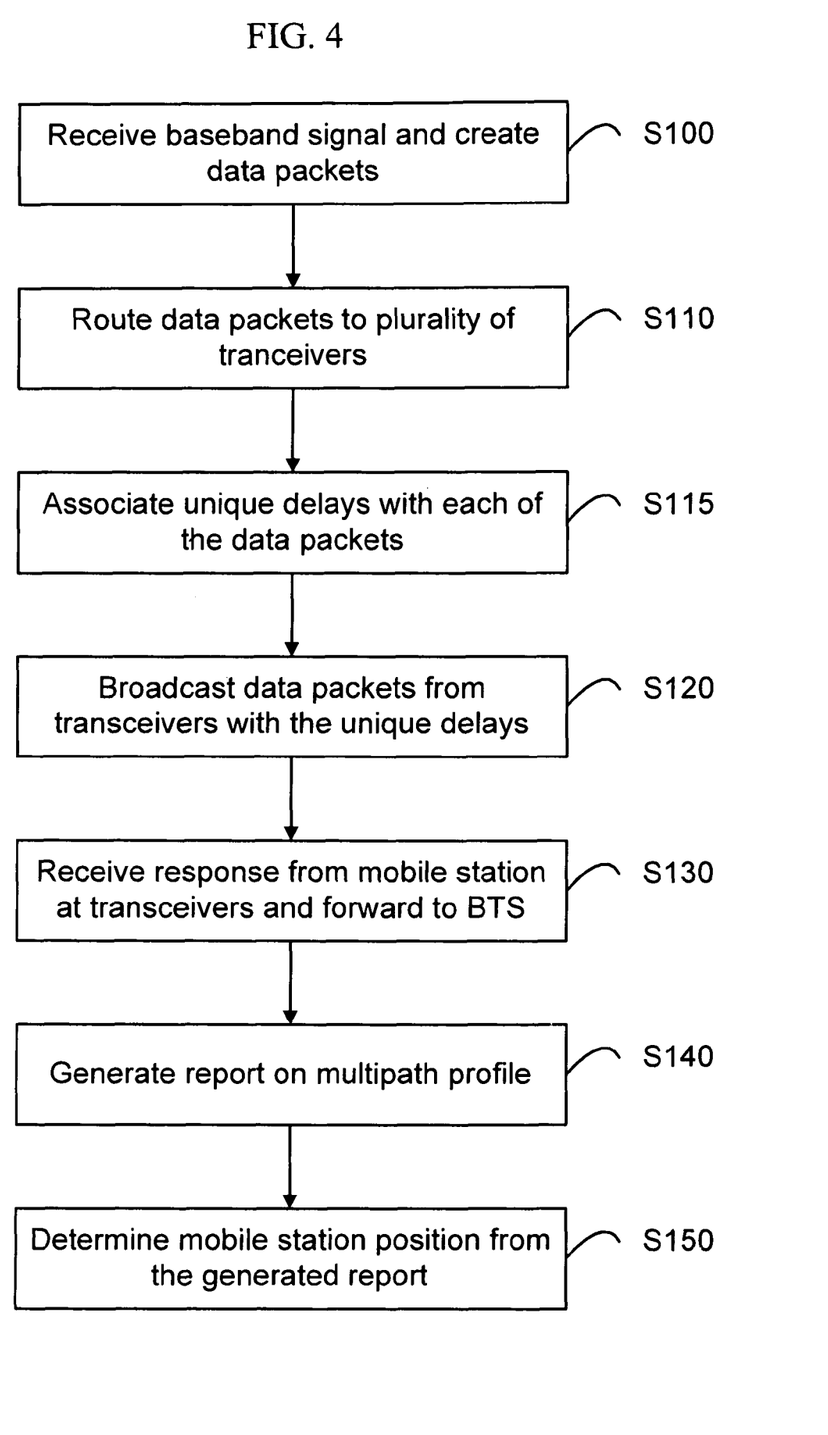
FIG. 4 illustrates a flow chart of the method for locating a mobile station according to an example embodiment of the present invention.

FIG. 4 illustrates a flow chart of the method for locating a mobile station according to an example embodiment of the present invention. As shown, in step S100, the BSI 200 receives baseband signals from the BTS 180, buffers the baseband signals and creates data packets. The data packets are sent through an Ethernet network 210 to a switch 220. The switch 220 routes the data packets to a plurality of RRHs $230$-$230_n$ in step S110. In step S115, the RRHs $230$-$230_n$ associate unique delays with each of the data packets. Each of the plurality of RRHs $230$-$230_n$, using the uniquely delays, broadcasting the data packets with respect to each other in step S120. A mobile station 102 receives the broadcast data packet from at least one of the plurality of RRHs $230$-$230_n$, and transmits a response. The RRHs receive the response and forward the responses the BTS 180 in step S130. The BTS 180 obtains the multi-path profile for the mobile station 120 based on the received responses. In particular, in step S140, the BTS 180 generates a report of the received power at each delay associated with the RRHs and sends the report to the position determining entity 240. Alternatively, the BTS 180 reports only the delay of the dominant multi-path; namely, reports which delay associated with the RRHs has the highest received power. In step S150, the position determining entity 240 determines the RRH associated with delay having the highest received power as being the RRH to which the mobile station is closest.

Multi-Path Approach

In another example embodiment of the present invention, the strength of the multi-paths may be used to refine the location of the mobile station within a building. In the indoor environment with short RRH ranges, the decay of the signal strength with respect to distance is significant. For example, assuming free space propagation, at 30 meters, a 10 meter movement (from 25 m to 35 m) of a mobile station 102 corresponds to a change of 3 dB in received power level, while at 1000 meters, a 10 meter movement of the mobile station 10 corresponds to a change of less than 0.1 dB, which is not significant enough to resolve. More realistic propagation models may have even steeper change of average signal strength with respect to distance. Accordingly, the relative strength of the multi-paths may be converted into approximate relative distances from an RRH, and used to determine the mobile station's location more precisely.

Pilot Beacon Approach

In another example embodiment of the present invention, a finger printing signal may be added to the RRH RF signal that can be measured and reported by a mobile station 102. The measurements made by the mobile station 102 may be air-interface dependent.

For CDMA/UMTS standards, additional low power pilot signals at the same frequency as the main carrier signal, but with different pseudorandom noise (PN) offsets (in CDMA case) or different scrambling codes (in UMTS) plus time offsets can be generated locally at the RRHs $230$-$230_n$ and transmitted together with the main carrier signal. The PN offsets or scrambling codes of the added pilots may be added into the neighbor list of the BTS so that the mobile station 102 will monitor and report on the added pilot signals. Once the mobile station 102 is in an active connection with the BTS, the mobile station 102 will report on the additional pilot signals received. Because each of the RRHs $230$-$230_n$ has a unique PN offset or scrambling code, the BTS will know which one of the RRHs $230$-$230_n$ sent the data packet. Thus the BTS will also know to which one of the RRHs $230$-$230_n$ the mobile station 102 is closer.

When a mobile station 102 is in active call, from time to time (e.g., every 5 seconds) or in response to an event trigger (e.g., strength of signal criteria), the mobile station 102 reports a pilot strength measured signal message to the BTS. The pilot strength measured signal message may contain the phase of the PN offset and the strength of the PN offset for one of the RRHs $230$-$230_n$. The measured phase and strength of the PN offset of the RRHs $230$-$230_n$ are used to determined the location of the mobile station 102 with respect to one of the RRHs $230$-$230_n$.

It is desirable to use as few different PN offsets or scrambling codes as possible to minimize the size of the neighbor list that the mobile station 102 maintains. The added pilot signals should also be kept low to minimize interference to the carrier signal.

Figure 5:
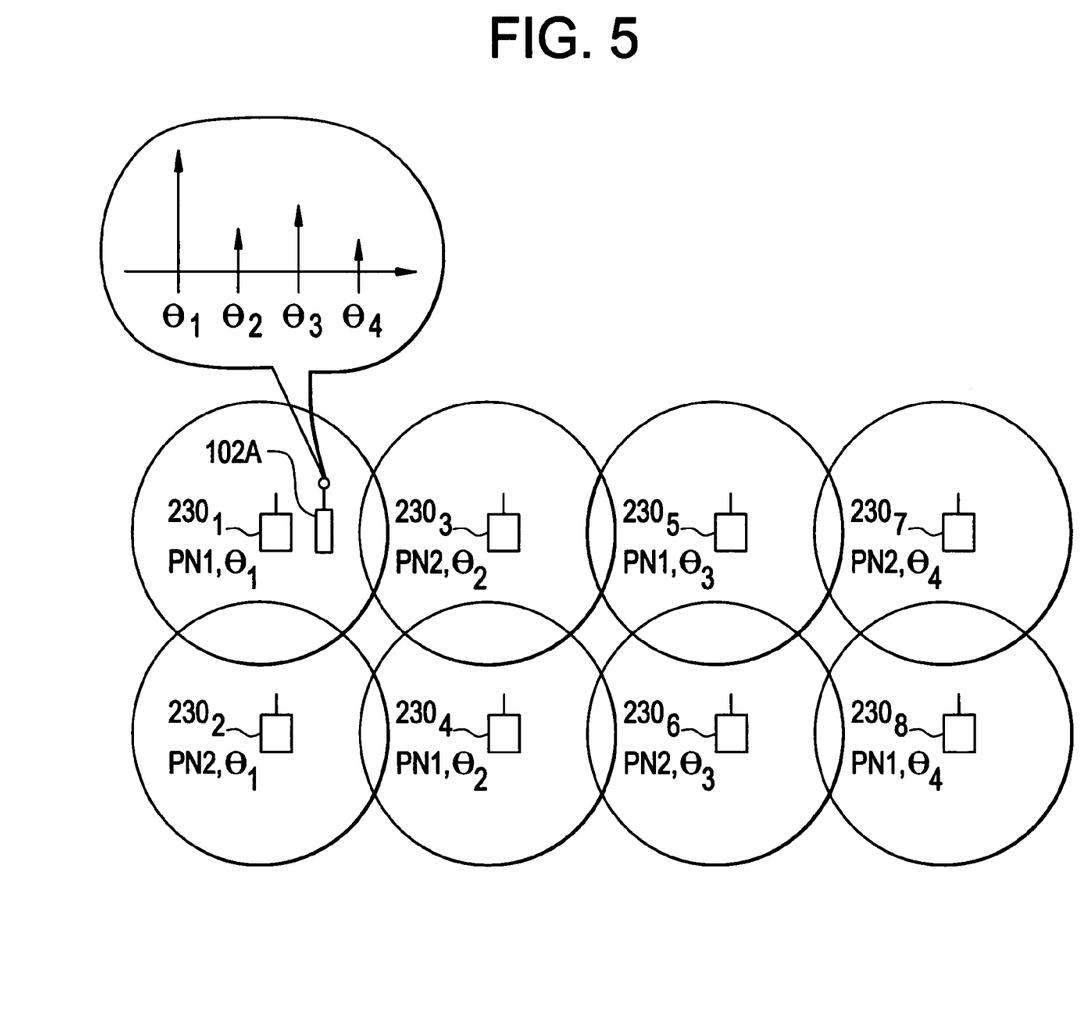
FIG. 5 graphically illustrates the PN offsets and phases of pilot beacons signals received in an example DAS having eight RRHs.

FIG. 5 graphically illustrates the PN offsets and phases of pilot beacons signals received in an example DAS having eight RRHs. In FIG. 5, two (2) PN offsets are used by the eight RRHs $230_1$-$230_8$ providing coverage for a single BTS sector. As will be appreciated, more than two (2) PN offsets may be used. In particular, RRHs $230_1$, $230_4$, $230_5$ and $230_8$ are assigned PN offset PN1, and RRHs $230_2$, $230_3$, $230_6$ and $230_7$ are assigned PN offset PN2. The RRHs using the same PN offset are each assigned a different phase or time delay. For example, phases θ1-θ4 are respectively assigned to RRHs $230_1$, $230_4$, $230_5$ and $230_8$ for their pilot beacon signals, and phases θ1-θ4 are respectively assigned to RRHs $230_2$, $230_3$, $230_6$ and $230_7$ for their pilot beacon signals.

In FIG. 3, a mobile station 102A measures PN1 and PN2, and reports θ1 and θ2 as their respective phases. Based on that information and the relative strength of PN1 and PN2 as can be seen from the bubble over mobile station 102A, the location of the mobile station 102A may determined to be somewhere between RRHs $230_1$ and $230_2$, and closer to the RRH $230_1$.

Additionally, the transmission of the beacons by the RRHs $230_1$-$230_8$ may be discontinuous (300 ms on, 700 ms off), and the on time between the RRHs $230_1$-$230_8$, may be coordinated so that one of the RRHs $230_1$-$230_8$ may be identified based on the time the mobile station 102 reports the pilot measurement. Again, the relative strength of the pilot beacons measured at different times can be used to further refine the location of the mobile station 102. This also minimizes the interference to the system generated by the beacon signals. This method can be combined with at least one of the other methods to avoid the ambiguity of phase measurement and minimize the number of PN offsets used. There are also additional methods of configuring the added pilot signals. For example, in the CDMA system, the pseudo-pilot concept may be used, in which multiple PN offsets with different phases are transmitted by each RRH.

Figure 6:
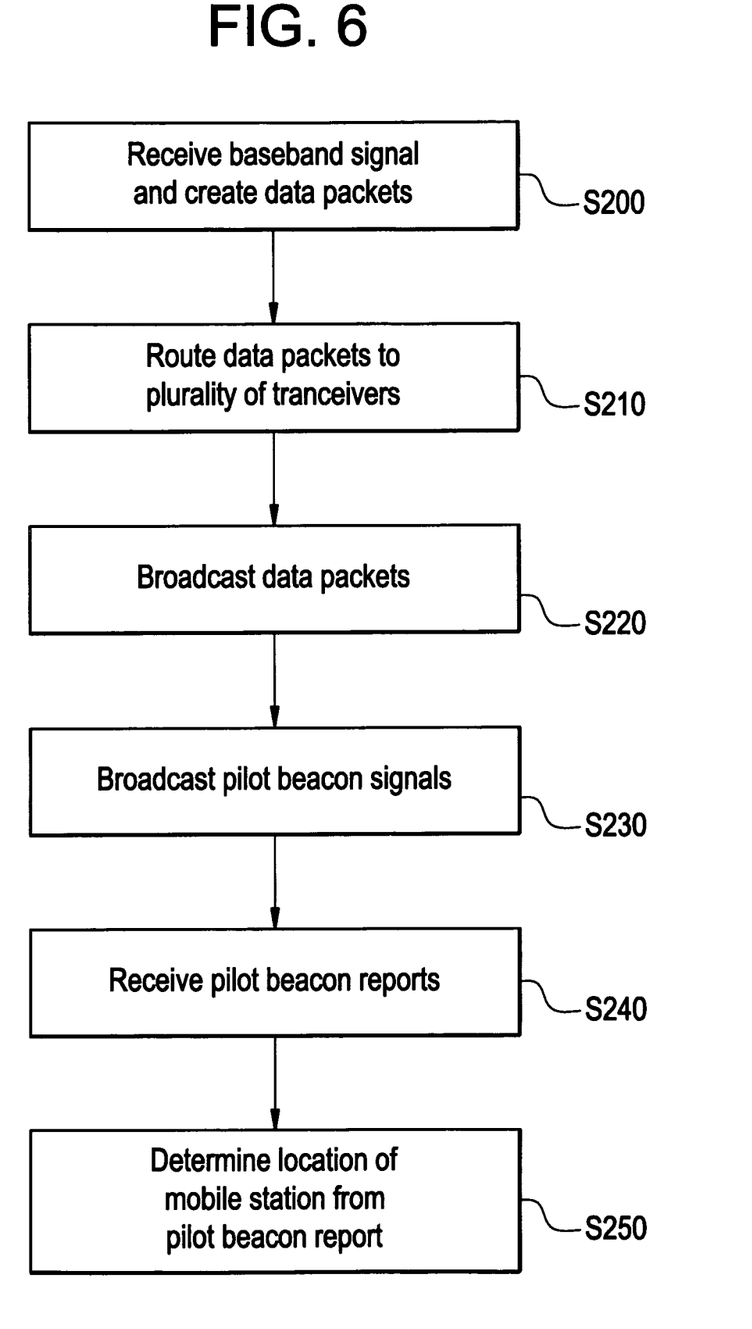
FIG. 6 illustrates a flow chart of the method for locating a mobile station according to another example embodiment of the present invention.

FIG. 6 illustrates a flow chart of a method of locating a mobile station according to an example embodiment of the present invention. As shown, the BSI 200 receives baseband signals from the BTS 180. The BSI 200 buffers the baseband signals and creates data packets in step S200. The data packets are sent through an Ethernet network 210 to a switch 220. The switch 220 routes the data packets to a plurality of RRHs 230-$230_n$ in step S210. Each of the plurality of RRHs 230-$230_n$ uniquely adds a pilot beacon signal, or a plurality of pilot beacon signals with different pseudonoise (PN) offsets (in CDMA case) or different scrambling codes (in UMTS), in addition to broadcasting the data packets in step S220. Once the mobile station 102 receives the broadcast data packet from one of the plurality of RRHs 230-$230_n$, the mobile station 102 periodically, or in response to an event trigger, sends a pilot beacon report in step S230. The pilot beacon report indicates the received signal strength of the different pilot beacons (i.e., different PN offsets) with the different phase offsets. These reports are received at the RRHs and sent to the BTS 180 in step S240. In step S250, the BTS 180 determines the location of the mobile station 102 based on the reports from the mobile station 102 as discussed above with respect to FIG. 5. Alternatively, the BTS 180 forwards the reports to the position determining entity 240, which determines the location of the mobile station 102 as discussed above with respect to FIG. 5.

Sniffing Signals from RRHs Approach

Figure 7:
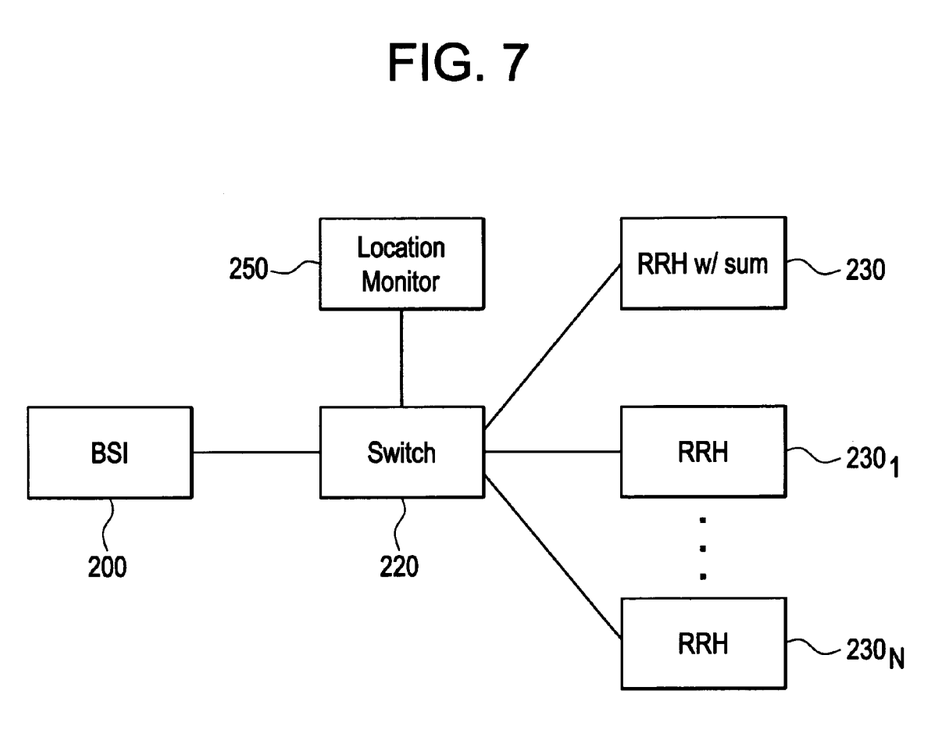
FIG. 7 illustrates a portion of a wireless communication system according to another embodiment of the present invention.

In another example embodiment of the present invention, a location management unit (entity) 250, which receives uplink packets and then performs a full air interface specific decode to determine uplink mobile stations 102 that are active within a particular RRH 230-$230_n$, may be used as shown in FIG. 7. FIG. 7 illustrates a portion of a wireless communication system according to another embodiment of the present invention. This embodiment includes the embodiment of a distributed antenna system (DAS) described above with respect to FIG. 2; therefore, only the differences between the embodiment of FIG. 7 and FIG. 2 will be described for the sake of brevity.

Consider a request for location information for a particular mobile station 102. The network will know which sector the mobile station 102 resides (i.e., the BTS) but not the specific RRH 230-$230_n$. In an example embodiment of the present invention, at a time of a mobile station location request, uplink packets from a particular RRH would be additionally sent to an air-interface specific location monitor 250 by the switch 220. The air-interface specific location monitor 250 is capable of monitoring the communications from a particular RRH and thus could locate active mobile stations 102 within the monitored RRH, for example, RRH 230. Once that is complete, then the system can monitor the next RRH $230_1$, and so forth until all of the RRHs have been monitored in one short time interval (about 10 seconds to monitor the entire sector).

This could also be done continuously as well as on a transaction basis, providing the information in pseudo-real time. For example, if an emergency 911 call is received then the user identification information will be available. In addition, the particular sector of the BTS is known by the network. The user identification information may then be used to identify which of the several RRH units currently associated with the particular BTS are serving the particular mobile station 102. At other times, the mobile station 102 may be mapped for all of the RRH locations and all of the sectors in a particular building.

This method could be employed without requiring any changes to the serving BTS or network as the only information required is the user identification information.

Although example embodiments of the present invention have been described with respect to locating a mobile station in a building, it should be appreciated that the example embodiments of the present invention may apply to locating a mobile station in any in-door environment or in-structure (natural or man-made), e.g., an underground facility, a parking basement, a tunnel, a subway station, etc.

Example embodiments of the present invention being thus described, it will be obvious that the same may be varied in many ways. Such variations are not to be regarded as a departure from the invention, and all such modifications are intended to be included within the scope of the invention.

What is claimed is:

1. A method for locating a mobile station, comprising:
   creating a plurality of data packets, each data packet in the plurality of data packets including a plurality of coded cellular signals;
   sending the plurality of data packets over a data network associated with at least one sector served by a plurality of transceivers;
   inserting, by each of the plurality of transceivers, a unique delay to the readout of a buffer associated with each of the transceivers, the unique delay being configured to delay round trip communications associated with each of the transceivers;
   broadcasting the plurality of data packets over the air by at least one of the plurality of transceivers; and
   determining a location of the mobile station based on received multi-paths associated with response from the mobile station to broadcast of at least one of the plurality of data packets and delay signatures of the mobile station, the delay signatures being associated with the unique delay.

2. The method of claim 1, wherein the location of the mobile station is determined based on respective delays of the received multi-paths.

3. The method of claim 1, wherein the location of the mobile station is determined by identifying a dominant one of the received multi-paths.

4. The method of claim 1, wherein the mobile station is determined as located closest to a transceiver having a delay associated with a dominant one of the received multi-paths.

5. The method of claim 4, wherein each of the plurality of transceivers uniquely delays broadcast of the plurality of data packets with respect to one another.

6. The method of claim 4, wherein each of the plurality of transceivers uniquely delay uplink packaging of a response from the mobile station.

7. The method of claim 4, further comprising:
refining the determined location by tri-laterating a respective delays of the multi-paths.

8. The method of claim 4, further comprising:
refining the determined location of the mobile station based on strengths of the received multi-paths.

9. The method of claim 1, wherein the location of the mobile station is determined based on strengths of the received multi-paths.

* * * * *